United States Patent [19]

Clyburn

[11] 4,326,687
[45] Apr. 27, 1982

[54] PLURAL LEG STAND

[75] Inventor: C. Wayne Clyburn, Cincinnati, Ohio

[73] Assignee: James David Mfg. Corp., Creve Coeur, Mo.

[21] Appl. No.: 173,464

[22] Filed: Jul. 30, 1980

[51] Int. Cl.³ ............................................. F16M 11/38
[52] U.S. Cl. .................................. 248/168; 248/188.6
[58] Field of Search ............... 248/168, 169, 170, 171, 248/167, 188.6, 188.7, 460, 463

[56] References Cited

U.S. PATENT DOCUMENTS

| | | |
|---|---|---|
| 298,257 | 5/1884 | Vail .................................. 248/168 X |
| 697,147 | 4/1902 | Howard ........................... 248/169 X |
| 1,525,701 | 2/1925 | Rose et al. ....................... 248/170 X |
| 1,896,086 | 2/1933 | Howell ............................ 248/168 X |
| 1,959,886 | 5/1934 | Wadsworth ..................... 248/168 X |
| 2,064,232 | 12/1936 | Tepper ............................ 248/460 X |
| 2,550,415 | 4/1951 | Kammermeyer ............. 248/188.6 X |
| 2,744,712 | 5/1956 | Brandt ............................ 248/460 X |
| 4,124,188 | 11/1978 | Machen ........................... 248/188.6 |
| 4,171,116 | 10/1979 | Carver ............................ 248/169 X |

*Primary Examiner*—J. Franklin Foss
*Attorney, Agent, or Firm*—Wood, Herron & Evans

[57] ABSTRACT

A plurality leg stand, e.g., a tripod, with a novel one piece connector head that connects the legs at the top ends thereof. The one piece connector head, which is molded from an elastomer, has a number of hinge lines molded in a lower face which equal the number of stand legs, thereby permitting the stand's legs to move between collapsed parallel storage position and erected pyramid stand position. The head also includes a pad on an upper face that is sized to cooperate with the hinge lines molded in the lower face to provide certain definition for those hinge lines. The pad is of a thickness that the pad's top surface is elevated above the legs to receive a horizontal display bar at any rotational position thereon when the stand is erected.

8 Claims, 5 Drawing Figures

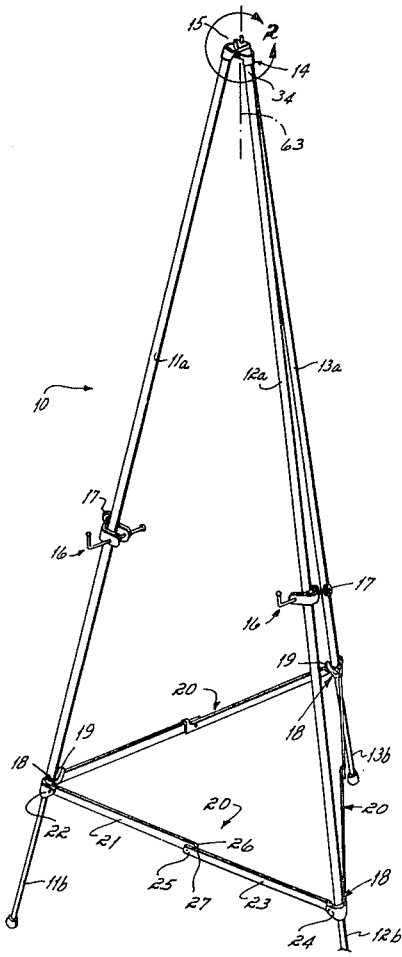

PLURAL LEG STAND

This invention relates to stands. More particularly, this invention relates to plural leg stands such as, e.g., easels and the like.

Easels have been known for many years. Easels typically are used to display poster boards or blackboards or the like in many different educational type use situations. Typically, an easel comprises a plural leg stand in the form of, e.g., a tripod. Two of the tripod's three legs are provided with support fingers or the like for holding a poster board or blackboard or large paper pad on the easel for display purposes. The easel's legs are movable between a collapsed storage position where the legs are substantially parallel one to the other, and an erected use position where the legs are in a tripod configuration. The easel's legs are provided with a connector structure at the top or apex of those legs which permits translation of the tripod between the storage and the use positions.

It is toward the connector head for a plural stand, e.g., for a tripod-type easel, that this invention is directed. In the prior art, the three legs of a tripod have been connected at the apex by a series of brackets or plates restrained in assembly with the legs by separate fasteners. This plural parts connector head assembly of the type known to the prior art increases the manufacturing cost of the easels due to the increased labor involved. Further, the plural parts head may cause the easel to become inoperative during use if any fasteners, e.g., nuts and bolts, work loose and are lost, thereby reducing the useful life of the easel.

Accordingly, it has been the objective of this invention to provide a new and improved plural leg stand which incorporates a novel one-piece connector head for the stand's legs, that head permitting the stand's legs to be easily and simply connected one to the other at the stand's apex while permitting the legs to move between a collapsed storage position and an erected polyhedron type position during use.

In accord with this objective, and in preferred form, the connector head is of a one-piece configuration molded from an elastomer, e.g., polypropylene. The head includes a plate and plural cups which depend from the underside thereof, each of the cups being adapted to receive a leg in friction fit assembly. The plate is formed with plural grooves on a lower face thereof, those grooves being provided in a regular geometrical configuration having a number of sides equal to the number of legs in the stand, e.g., three grooves in an equilateral triangular configuration for a tripod stand. The grooves cooperate with the plate to define hinge lines which separate plural ears (one leg cup being connected to each ear) from the plate's center section. A pad of the same geometry defined by the grooves is molded integral with an upper surface of the plate's center section, the pad being sized to cooperate with the grooves so as to provide certain definition to the hinge lines defined by those grooves. In use, the plural leg stand is movable between collapsed and erected positions through use of the integrally molded hinges. In the erected configuration, the height of the pad is such that the pad's top surface is no lower than a phantom plane which includes the uppermost points on each of the plate's ears. This pad structure, in the erected attitude, allows a display bar to be mounted on the pad at any rotational position relative to the stand's center axis as it upraises that bar above the uppermost points of the legs when the bar is bolted to the connector head.

Other objectives and advantages of this invention will be more apparent from the following detailed description taken in conjunction with the drawings in which:

FIG. 1 is a perspective view of a plural leg stand that includes a novel connector head in accord with the principles of this invention, the stand being shown in the erected position;

FIG. 2 is a top perspective view of the encircled area of FIG. 1 showing the connector head in greater detail;

FIG. 3 is a view similar to FIG. 2 but showing the connector head from a bottom perspective;

FIG. 4 is a side view of the connector head with a display bar attached, the connector head being shown in the erected position; and FIG. 5 is a side view similar to FIG. 4 but showing the connector head in the collapsed storage position.

A plural leg stand in accord with the principles of this invention, and in the form of an easel 10, is illustrated in FIG. 1. The easel 10 includes three legs 11–13 which provide a polyhedron configuration in the form of a tripod when the easel is in the erected or set-up position shown in that FIG. 1. The easel 10 also includes a connector head 14 that is connected with each of the three legs 11–13 at the apex 15 of the set-up easel for connecting those three legs together at that apex, the connector head being formed in accord with the principles of this invention as is illustrated in greater detail in FIGS. 2–5. The easel 10 further includes support fingers 16 that are positionable axially along two of the legs 11, 12. The support fingers 16 cooperate to provide a support for poster boards or a blackboard or a large tablet of paper (none of which is shown) or the like to be displayed on the easel 10. The support fingers 16 are slidable along each leg when a finger latch 17 associated with same is released, and are restrained in the desired position on those legs when the latch is latched, the latch being of any type known to the prior art.

Each of the easel's three legs 11–13 is comprised of an upper section 11a, 12a, 13a and a lower section 11b, 12b, 13b, each lower section being telescopable within its associated upper section. The lower telescoping section of each leg 11–13 is held at an extended or retracted position relative to its associated upper section by means of a leg latch 18 operated by a latch arm 19. The latch 18 may be of any type known to the prior art. This leg latch 18, therefore, permits the easel's legs to be extended as desired by the end user. Each pair 11, 12 and 12, 13 and 11, 13 of the easel's legs is connected together one with another by a break over arm 20. One half 21 of each break over arm 20 is pivotally connected as at 22 to one leg, and the other half 23 of the break over arm 20 is pivotally connected at 24 to the other leg, and those two break over arm halves 21, 23 are pivotally connected one to the other as at 25 adjacent their free ends. A detent 26 on one break over arm half 21 cooperates with a seat 27 on the other break over arm half 23 to maintain the linear or set-up position of the break over arm 20 when the easel 10 is erected to prevent inadvertent collapse of the easel.

The connector head 14 by which the legs 11–13 are interconnected one to the other at the easel's apex 15, i.e., at one end of the legs, is particularly illustrated in FIGS. 2–5. The connector head 14 itself is of a one-piece configuration preferably molded from an elastomer, e.g., a flexible polymer such as polypropylene. The head 14 includes a plate 30 which is of generally triangular configuration when viewed in top view in light of the tri-leg 11-13 easel structure with which it is used. Three leg cups 31-33 depend from the underside of the plate 30 and are molded integral therewith. Each of the cups 31-33 is sized to receive the top end 34 of a tripod leg 11 or 12 or 13 in friction fit assembly. Note particularly, the plate 30 is formed with a number of grooves 35-37 on a lower or bottom face 38 thereof, the grooves 35-37 being provided in a regular geometry pattern having a number of sides equal to the number of legs 11-13 with which the head is adapted for use. In the particular connector head 14 illustrated, and in light of the tripod-type easel 10 with which the head is connected, the three grooves 35-37 provided on the plate's lower face 38 form an equilateral triangle which subdefines the plate 30 into three separate ear sections 39-41 and a center section 42. Note that the leg cups 31-33 are molded integral with the plate's ear sections 39-41, and do not overlie the plate's center section 42. The grooves 35-37 function to define hinge lines 43-45 as described in further detail below.

The connector head 14 also includes a pad 48 molded integral with an upper face 49 of the plate's center section 42. The pad 48 is provided with a number of sides 50-52 equal to the number of legs 11-13 in the plural leg stand, and is of a regular geometry in top view. Further, and importantly, the pad 48 is sized, and the pad is oriented on the plate 30, to cooperate with the grooves 35-37 molded in the lower face 38 of the plate 30 so as to provide certain and reproducible definition to the hinge lines 43-45. In this regard, therefore, and in the connector head 14, the pad 48 is of an equilateral triangular configuration with the respective sides 50-52 of the triangular pad being disposed parallel to the respective grooves 35-37. Note further that the pad is of a height H which upraises the pad's top face 53 relative to the upper face 49 of the plate 30. The pad 48 also incorporates a bore 54 centrally positioned therethrough relative to the pad's regular geometry. This bore 54 is of generally square cross section, and extends from the pad's surface 53 through to the plate's lower surface 38 to cooperate with a carriage bolt 56 and wing nut 57 in a manner described in detail below.

In use, the tripod easel's three legs 11-13 are interconnected with the connector head 14 simply by slipping one end of each leg in friction fit assembly with one of the head's cups 31-33 as previously mentioned. With the head 14 and legs 11-13 so connected, the legs may be moved between a generally parallel or storage configuration shown in FIG. 5 and a polyhedron or tripod configuration shown in FIGS. 1-4. In the collapsed or storage position, note the plate 30 is generally planar with the tripod legs being disposed generally perpendicular to that plate, see FIG. 5. This movement of the legs 11-13 is accommodated because of hinge grooves 35-37 molded in the head's lower face 38 in cooperation with pad 48 on the head's upper face 49. In the use or erected position, note the plate's ears 39-41 slant upwardly relative to the plate's center section 42 about the hinge lines 43-45 as shown in particularly in FIGS. 2 and 4. And in this connection, note particularly that the support surface defined by the pad's top surface 53 is elevated above the uppermost points 58-60 of the plate's ears. In other words, the height H of the pad 48 is such that the top surface 53 defined by that pad is no lower than a phantom plane 61 which includes the uppermost points 58-60 on the connector head's ears 39-41. This pad 48 and plate 30 structure, in the easel 10 erected attitude, allows a display bar 62 to be mounted on the pad 48 (and, hence, on the easel 10) at any rotational position relative to the easel's center axis 63 since it insures that the display bar remains above the uppermost points 58-60 of the head's ears 39-41 when that bar is bolted to the head 14. The display bar 62 is bolted to the head's pad 48 by carriage bolt 56 received therethrough, the carriage bolt's square shank 64 being received in the square throughbore 54 to prevent rotation of that bolt during assembly of the bar with a connector head. The wing nut 57 fastens the display bar 62 to the easel's connector head 14. With the display bar 62 extending significantly outward from the apex 15 of the tripod easel 10, charts or graphs or the like (none of which are shown) may be easily hung therefrom by fasteners (not shown) for display by the easel's user.

Having described in detail the preferred embodiment of my invention, what I desire to claim and protect by Letters Patent is:

1. A stand comprising
  at least three legs, said legs being movable between a collapsed storage position at which said legs are disposed generally parallel one to another and an erect use position at which said legs are located in a generally polyhedron shaped configuration, and
  a one-piece connector head formed from an elastomer for connecting said legs together one to the other at the top end thereof, said connector head comprising
    a center section of a generally regular geometry, said center section having a number of sides equal to the number of said legs,
    an ear section extending outwardly from each side of said center section, each ear section being formed integral with said center section, and said center section and said ear sections defining a generally planar configuration when said legs are in said storage position,
    a cup depending from each of said ear sections, said cup being formed integral with said ear, and said cup being adapted to receive one of said legs in assembly therewith,
    hinge line structure defining a number of grooves on a face of said connector head between said center section and said ear sections, said grooves being equal in number to the number of said legs, said grooves defining a regular geometry that generally coincides with the regular geometry of said center section, and said structure cooperating with said ear sections and said center section to permit said legs to move between storage and use position, and
    a pad formed integral with said center section, said pad extending upwardly above said center section, said pad having a geometry identical to and overlying the regular geometry defined by said center section, said pad's sides thereby cooperating with said grooves to aid in defining said hinge line structure, and said pad having a top face that is positioned above a phantom plane that incorporates the uppermost points on said ear sections when said stand is in said use position.

2. A stand as set forth in claim 1, said grooves being provided in a lower surface of said head.

3. A stand as set forth in claim 1, said connector head comprising through bore structure centrally positioned in said center section, said through bore structure being adapted to cooperate with a fastener for restraining a display bar in assembly with said connector head when said stand is in the use position.

4. A stand as set forth in claim 1, said stand being in the form of an easel, and said easel having three legs.

5. A stand as set forth in claim 4, said head having three cups and said center section being of an equilateral triangle geometry.

6. An easel comprising at least three legs, said legs being movable between a collapsed storage position at which said legs are disposed generally parallel one to another and an erect use position at which said legs are located in a generally polyhedron shaped configuration, a one-piece connector head formed from an elastomer for connecting said legs together one to the other at the top end thereof, said connector head comprising a center section of a generally regular geometry, said center section having a number of sides equal to the number of said legs, an ear section extending outwardly from each side of said center section, each ear section being formed integral with said center section, a cup depending from each of said ear sections, said cup being formed integral with said ear, and said cup being adapted to receive one of said legs in assembly therewith, hinge line structure defining a number of grooves on a face of said connector head between said center section and said ear sections, said grooves being equal in number to the number of said legs, said grooves defining a regular geometry that generally coincides with the regular geometry of said center section to aid in defining said hinge lines, and said structure cooperating with said ear sections and said center section to permit said legs to move between storage and use positions, a pad formed integral with said center section, said pad extending outwardly above said center section, said pad having a geometry generally identical to and overlying the regular geometry defined by said center section, said pad's sides thereby cooperating with said grooves to aid in defining said hinge line structure, said pad having a top face that is positioned above a phantom plane that incorporates the uppermost points on said ear sections when said stand is in the use position, and through bore structure centrally positioned in said center section, said through bore structure being adapted to cooperate with a fastener for restraining a display bar in assembly with said connector head when said stand is in said use position, and support fingers connected to at least two legs of said stand, said support fingers cooperating with said legs to define a generally channel shaped frame for supporting at least one of a poster board, a blackboard and a paper tablet, said support fingers being slidable along said legs to that position desired by a user.

7. An easel as set forth in claim 6, said easel having three legs.

8. An easel as set forth in claim 7, said head having three cups and said center section being of an equilateral triangle geometry.

* * * * *